United States Patent [19]
Tamai et al.

[11] Patent Number: 5,602,338
[45] Date of Patent: Feb. 11, 1997

[54] DIFFERENTIAL PRESSURE DETECTING APPARATUS

[75] Inventors: Mitsuru Tamai; Etsuro Ito; Masahiro Osakabe; Seiji Suzuki, all of Kanagawa, Japan

[73] Assignee: Fuji Electric Co., Ltd., Kanagawa, Japan

[21] Appl. No.: 434,710

[22] Filed: May 4, 1995

[30] Foreign Application Priority Data

May 10, 1994 [JP] Japan ................................. 6-095993

[51] Int. Cl.⁶ ............................ G01L 13/02; G01L 15/00
[52] U.S. Cl. ............................................................ 73/716
[58] Field of Search .............................. 73/706, 716, 756

[56] References Cited

FOREIGN PATENT DOCUMENTS 0127776  12/1984  European Pat. Off. .
57-40625   3/1982  Japan .

Primary Examiner—Richard Chilcot
Assistant Examiner—William L. Oen
Attorney, Agent, or Firm—Finnegan, Henderson, Farabow, Garrett & Dunner, L.L.P.

[57] ABSTRACT

A differential pressure detecting apparatus includes a columnar main body wherein a differential pressure detection portion is inserted into a closed-end hole having a countersunk portion and formed in the outer circumferential surface of said main body at right angles to the axis of the main body, wherein a first seal diaphragm for receiving one of introduced pressures relating to a differential pressure to be measured is provided in one end surface of the main body, and wherein the main body has a hole provided for transmitting the received introduced pressure to the differential pressure detection portion; a disc-like sub-body inserted into the countersunk portion of the closed-end hole, wherein a second seal diaphragm for receiving the other introduced pressure is provided in the outer end surface of the sub-body, and wherein a hole is provided for transmitting the received introduced pressure to the differential pressure detection portion; a cover provided on the one end surface of the main body, and having a hole for the one introduced pressure for the first seal diaphragm; and another cover provided on the outer circumferential surface of the main body, and having a hole for the other introduced pressure for the second seal diaphragm.

8 Claims, 3 Drawing Sheets

5,602,338

DIFFERENTIAL PRESSURE DETECTING APPARATUS

BACKGROUND OF THE INVENTION

1. Field of the Invention

The present invention relates to a differential pressure detecting apparatus which is made small in size, light in weight and low in price, and in which a welded portion of a contact portion with an enclosed liquid is designed not to contact with outside air, so that the welded portion is prevented from being corroded even if the outside air is corrosive.

2. Description of the Related Art

A conventional example will be described with reference to FIG. 3 showing its sectional view. A cover 45 is fixed by not-shown mounting screws onto each of left and right sides of a body 41 through an O-ring 46, and an upper case 47 is welded onto the upper surface of the body 41. The body 41 has left and right end surfaces parallel to each other. A closed-end hole 41a countersunk with two stages is formed in the left end surface while a hole 41b is formed in the right end surface coaxially with the hole 41a. An electrostatic capacity type differential pressure detection portion 1 is inserted into a hole portion of the body 41, and leads 2 from the detection portion 1 are led out upward to the inside of the upper case 47. The upper case 47 includes an amplifier, various kinds of arithmetic operation circuits, an indicator, and so on. In addition, a sub-body 43 is inserted into the countersunk portion of the body 41. A seal diaphragm 44 is provided on the left end surface of this sub-body 43, and a hole 43a is formed along the axis of the sub-body 43. A liquid for transmitting pressure is enclosed in the inside space of the body 41, and each hole for filling the liquid is sealed with a ball 23 and a thrust screw 24. A not-shown hole for introducing pressure is formed in each of the right and left covers 45, so that one and the other pressure relating to differential pressure to be measured are introduced therefrom. These respective pressures are transmitted to the differential pressure detection portion 1 through the seal diaphragm 42 and 44 and the enclosed liquid so as to be converted into a change of electrostatic capacity corresponding to the differential pressure. This change of electrostatic capacity is converted into an electric current, by a well known technique, through the amplifier, the arithmetic operation circuits and so on provided in the upper case 47, indicated on the spot, and transmitted to a distant place at the same time.

Another conventional example will be described with reference to FIG. 4 showing its sectional view. In the drawing, this conventional example is roughly constituted by a detection portion 50 and a protection portion 60 which are made to communicate with each other through pressure introducing tubes 51 respectively. The detection portion 50 converts the differential pressure to be measured into an electric signal by way of electrostatic capacity, and outputs the thus obtained electric signal. The protection portion 60, which will be described in detail later, protects the detection portion 50 from the introduced pressures. The structure of this detection portion 50 is well known, and therefore the description thereof is omitted. The protection portion 60 is constituted mainly by left and right bodies 61, a protective diaphragm 65, left and right seal diaphragms 64, O-rings 66 and pressure introducing covers 67. The respective bodies 61 are disposed on the left and right of the protective diaphragm 65, and connected with each other on their outer circumference or circumferential edge portions.

A hollow portion 63 and holes 62 are formed in each of the bodies 61. Description will be made more specifically upon the right body 61 representatively. The hollow portion 63 is formed in the left side surface of the body 61 into a conical shape coaxial with the body 61. One of the holes 62 penetrates the body 61 along the axis of the body 61, while the other hole 62 opens near the center of the hollow portion 63 on the one hand, and, on the other hand, penetrate the pressure introducing tube 51 so as to communicate with a not-shown pressure introducing space of the detection portion 50. The right side surface of the body 61 is formed so as to have a wavy section, and the seal diaphragm 64 having almost the same shape as this wavy section is fixed to the circumferential edge of the right side surface of the body 61 so as to have a gap between the seal diaphragm 64 and the right side surface of the body 61. The cover 67 is attached to the circumferential edge of the right side surface of the body 61 through the O-ring 66. Substantially the same is applied also to the left body 61. Silicon oil (enclosed liquid) as a pressure transmitting liquid is enclosed The inside space of each of the bodies 61.

This conventional example has an effect as follows. If respective introduced pressures (including static pressure) on both sides of a differential pressure type flowmeter such as an orifice meter are received on the respective seal diaphragms 64, the respective introduced pressures are transmitted to their associated pressure introducing spaces of the detection portion 50 through the spaces adjacent to the seal diaphragms 64, the holes 62 and the hollow portions 63 respectively. Each of the seal diaphragms 64 has an extremely small spring constant (that is, it is very soft), while a not-shown detecting diaphragm of the detection portion 50 has an extremely large spring constant (that is, it is very hard). The spring constant of the protective diaphragm 65 takes an intermediate value of the above two spring constants. In the detection portion 50, a differential pressure based on the respective introduced pressures is converted into an electric signal in a well-known electrostatic capacity technique, and the electric signal is outputted. This is the case in which a normal pressure introducing operation is carried out.

However, assuming that only the right seal diaphragm 64 receives one of the introduced pressures by a wrong operation, there is a fear that the detection portion 50 receives a large biased pressure so that the detection portion will be broken if the protective portion 60 is not provided. Even in the case where only one of the introduced pressures is received by one of the seal diaphragms with a wrong operation in the introduction of the introduced pressures on the both sides of the orifice meter, the protection portion 60 protects the detection portion 50 by such an operation as follows. Assume that only the right seal diaphragm 64 receives pressure. Then, on one hand, this pressure is transmitted from the right hole 62 and hollow portion 63 to the left hollow 63 and hole 62 through the enclosed liquid and through the protective diaphragm 65 to thereby expand the left seal diaphragm 64. On the other hand, this pressure is transmitted, through the right hole 62, to the right pressure introducing space of the detection portion 50. However, this transmitted pressure is limited to a certain value or less since the right seal diaphragm 64 contacts with the right wavy surface of the body 61 opposite toe the diaphragm 64. Thus the function to protect the detection portion 50 operates so that there is no fear that the detection portion 50 is broken.

In the former of the above conventional examples, in which the covers 45 for introducing pressure are disposed on both sides of the body 41, the size is therefore increased not only lengthwise but also widthwise. Accordingly, there is a defect that it is inevitable to increase the size, the weight and the cost.

In the latter of the above conventional examples, which is constituted by a protection portion 60 having a protection function from biased pressure and a detection portion 50 installed in the upper thereof, there is a defect that it is inevitable to increase the size, the weight and the cost in the same manner as in the previous conventional example. In addition thereto, since a welded portion of a contact portion with an enclosed liquid, specifically, a welded portion between an outer circumferential portion of a protective diaphragm 65 and an outer circumferential portion of an end surface of each of left and right bodies 61 contacts with outside air, there is a defect that the welded portion is corroded if the outside air is corrosive.

SUMMARY OF THE INVENTION

It is an object of the present invention to solve the foregoing problems belonging to the prior art.

It is another object of the invention to provide a differential pressure detecting apparatus which is made small in size, light in weight and low in cost, and in which a welded portion of a contact portion with an enclosed liquid is prevented from contacting with outside air, so that the welded portion is prevented from being corroded even if the outside air is corrosive.

In order to achieve the above objects, according to an aspect of the present invention, the differential pressure detecting apparatus comprises: a columnar body wherein a differential pressure detection portion is inserted into a closed-end hole having a countersunk portion and formed in the outer circumferential surface of the body at right angles to the axis of the body, wherein a first seal diaphragm for receiving one of introduced pressures relating to a differential pressure to be measured is provided in one end surface of the body, and wherein the body has a hole provided for transmitting the received introduced pressure to the differential pressure detection portion; a disc-like sub-body inserted into the countersunk portion of the closed-end hole, wherein a second seal diaphragm for receiving the other introduced pressure is provided in the outer end surface of the sub-body, and wherein a hole is provided for transmitting the received introduced pressure to the differential pressure detection portion; a cover provided on the one end surface of the body, and having a hole for the one introduced pressure for the first seal diaphragm; and another cover provided on the outer circumferential surface of the body, and having a hole for the other introduced pressure for the second seal diaphragm; wherein a pressure transmitting liquid is enclosed in an inside space between the body and the sub-body, and leads of the differential pressure detection portion are led out from the other end surface of the body.

Preferably, the other of the introduced pressures relating to the differential pressure to be measured is an atmospheric pressure, and the other cover corresponding to the other introduced pressure is a plate-like member provided with air permeability in the outer circumferential surface of the body.

According to another aspect of the present invention, the differential pressure detecting apparatus comprises: a body having parallel end surfaces, wherein a first seal diaphragm for receiving one of introduced pressures relating to a differential pressure to be measured is provided in one of the end surfaces, and wherein a differential pressure detection portion is inserted into a closed-end hole having two-stages of countersunk portions and formed in the other end surface; a disc-like diaphragm unit inserted into the first-stage small-diameter countersunk portion of the body, and having a protective diaphragm and spaces disposed on both sides of the protective diaphragm; a disc-like sub-body inserted into the second-stage large-diameter countersunk portion of the body, wherein a second seal diaphragm for receiving the other introduced pressure is provided in the outer end surface of the sub-body, and wherein a hole is provided for transmitting the received introduced pressure to one of the spaces on the both sides of the diaphragm unit; a cover provided on one of the end surfaces of the body, and having a hole for the introduced pressure for the first seal diaphragm; and another cover provided on the other end surface of the body, and having a hole for the other introduced pressure for the second seal diaphragm of the sub-body; wherein the respective introduced pressures relating to the differential pressure to be measured are transmitted to respective spaces of the differential pressure detection portion and the diaphragm unit through a pressure transmitting liquid enclosed in inside spaces among the body, the sub-body and the diaphragm unit, and leads of the differential pressure detection portion are led out from the outer circumferential surface of the body.

In one aspect of the present invention, one of introduced pressures relating to the differential pressure to be measured is received by a first seal diaphragm through an introducing hole of a cover disposed on one of the end surfaces of a body, and transmitted to a differential pressure detection portion through an enclosed liquid. The other introduced pressure is received by a second seal diaphragm through an introducing hole of a cover disposed on the outer circumferential surface of the body, and transmitted to the differential pressure detection portion through the enclosed liquid.

In another aspect of the present invention, one of the introduced pressures relating to the differential pressure to be measured is received by a first seal diaphragm through an introducing hole of a cover disposed on one of the end surfaces of a body, and transmitted to one of spaces of a diaphragm unit and a differential pressure detection portion through the enclosed liquid respectively. The other introduced pressure is received by a second seal diaphragm through an introducing hole of a cover disposed on the other end surface of the body, and transmitted to the other space of the diaphragm unit and the differential pressure detection portion through the enclosed liquid respectively. When only one of the introduced pressures relating to the differential pressure to be measured operates as a large biased pressure because of a wrong operation, or the like, the differential pressure detection portion is prevented from receiving excessive pressure by a well-known protection function based on a protective diaphragm of the diaphragm unit, so that the differential pressure detection portion is protected from the large biased pressure. Further, the whole of a welded at a place which contacts with the enclosed liquid can be disposed inside the body structurally, so that the welded portion can be prevented from contacting with outside air.

BRIEF DESCRIPTION OF THE DRAWINGS

The above and other objects and features of the present invention will be more apparent from the following description taken in conjunction with the accompanying drawings.

DETAILED DESCRIPTION OF THE PREFERRED EMBODIMENTS

Figure 4:
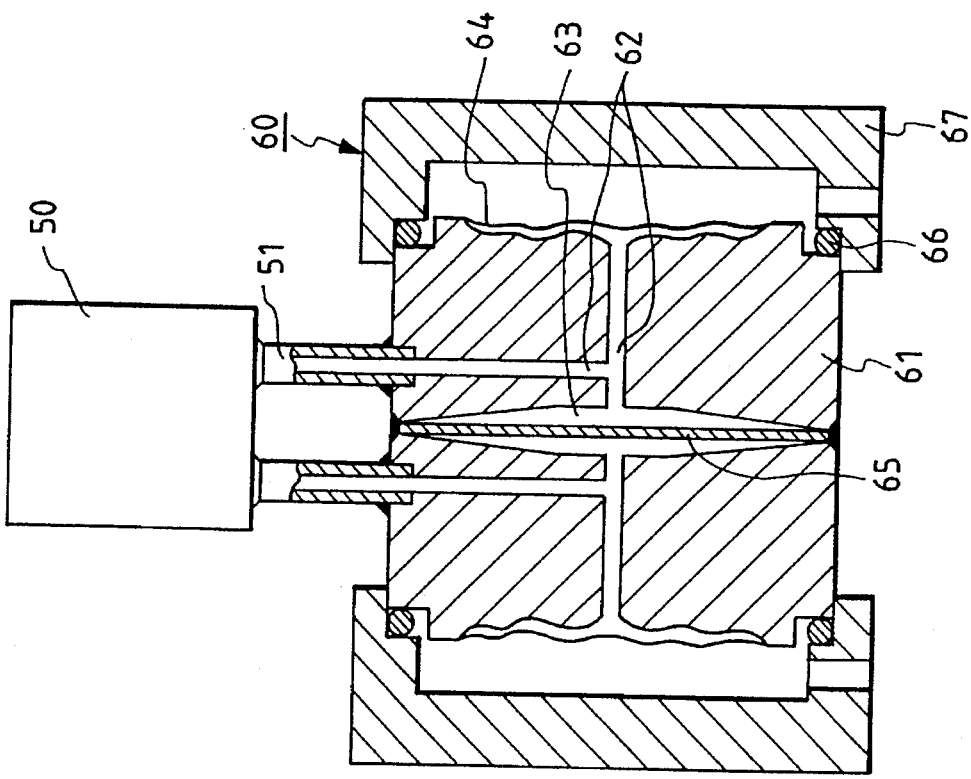
FIG. 4 is a sectional view of another conventional differential pressure detecting apparatus.
Figure 1:
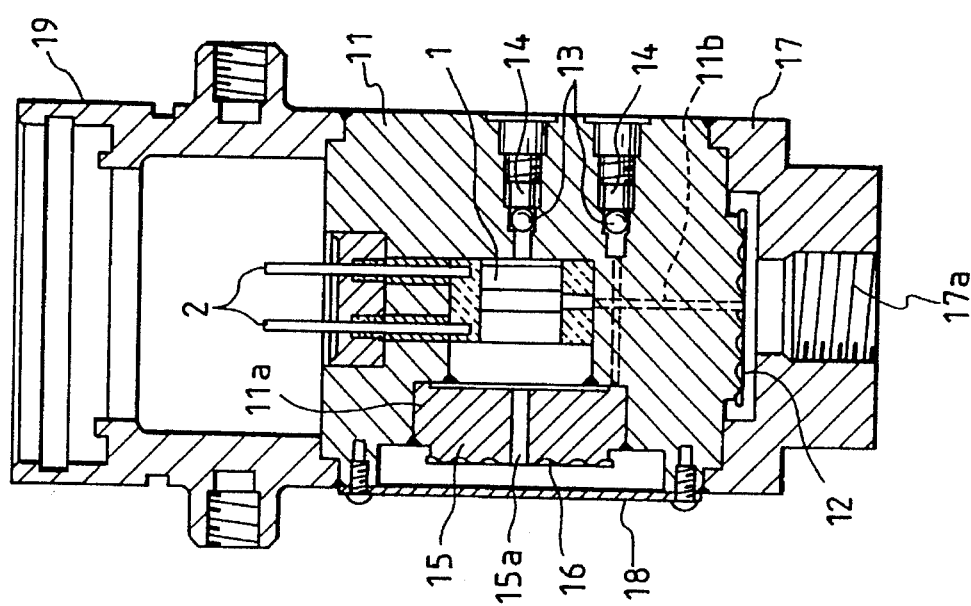
FIG. 1 is a sectional view showing a differential pressure detecting apparatus according to a first embodiment according to the present invention.

Embodiments of a differential pressure detecting apparatus according to the present invention will be described below with reference to the drawings. A first embodiment corresponding to the first conventional example is constituted as a gauge pressure detecting apparatus 10, having a structure shown in the sectional view of FIG. 1. In the drawing, this gauge pressure detecting apparatus 10 is mainly constituted by a body 11 including a differential pressure detection portion 1, a sub-body 15, a cover 17, and an upper case 19. The body 11 is formed into a conical shape, in which a countersunk hole 11a is formed in the left outer circumferential surface perpendicularly to the axis, and a countersunk hole 11b communicating with the countersunk hole 11a is formed in the lower end surface. In addition, two holes which communicate with the bottom surface of the countersunk hole 11a and the countersunk surface and which are not referenced in the drawing are made in the right outer circumferential surface perpendicularly to the axis. These two holes are for filling the inside space with silicone oil which is a liquid for transmitting pressure. The two holes are sealed by balls 13 and thrust screws 14 after filling the silicone oil. The lower end surface of the body 11 has a slight gap formed between the lower end surface and a seal diaphragm 12 provided there, and the lower end surface is finished into a wavy form corresponding the seal diaphragm 12. This seal diaphragm 12 receives pressure to be measured, as will be described later.

The sub-body 15 is shaped into a disc, and a hole 15a is formed so as to penetrate the sub-body 15 in the axial direction thereof. The left side surface of the sub-body 15 has a gap between the left side surface and a seal diaphragm 16 provided there for receiving the atmospheric pressure, and the left side surface is finished into a wavy form corresponding the diaphragm 16. The differential pressure detection portion 1 is inserted into a hole portion of the countersunk hole 11a of the body 11, and the sub-body 15 is inserted into the countersunk portion. Leads 2 from the differential pressure detection portion 1 are led out upward through the upper end surface of the body 11. After the differential pressure detection portion 1 and the sub-body 15 are fixed to the body 11, the inside space between the body 11 and the sub-body 15 is filled with silicone oil, and thereafter sealed by the balls 13 and the thrust screws 14 as mentioned above.

The cover 17 is a disc-like member with a flange. A hole 17a for introducing pressure to be measured penetrates the cover 17 in the axial direction. The circumferential edge portion of the cover 17 is fixed by welding to the lower end surface of the body 11. The upper case 19 is a columnar member including therein an amplifier, arithmetic operation circuits, an indicator, and so on. The circumferential edge portion of the upper case 19 is fixed by welding to the upper end surface of the body 11. The cover 18 is a plate-like member curved into an arc along the left outer circumferential surface of the body 11, and screwed down thereto with air permeability, that is, with a gap formed between the cover 18 and the body 11. If the cover 18 on the side of the atmospheric pressure is replaced by a cover fixed to the body 11 air-tightly, it becomes for introducing another pressure by which general differential pressure can be detected.

The pressure to be measured is introduced from the hole 17a of the cover 17, received by the seal diaphragm 12, and transmitted to the corresponding side of the differential pressure detection portion 1 through the silicone oil and the hole 11b. The atmospheric pressure as a reference pressure is received by the seal diaphragm 16 of the sub-body 15 through the gap between the cover 17 and the outer circumferential surface of the body 11, and transmitted to the corresponding side of the differential pressure detection portion 1 through the silicone oil and the hole 15a. The differential pressure detection portion 1, which is of the electrostatic capacity type here, converts the differential pressure between the pressure to be measured and the atmospheric pressure, that is, the gauge pressure into a change of electrostatic capacity corresponding thereto, and outputs the change through the leads 2. This change of electrostatic capacity is converted into an electric current corresponding to the gauge pressure by a not-shown amplifier and arithmetic operation circuits, indicated on the spot by a not-shown indicator, and transmitted to a distant place at the same time.

Figure 2:
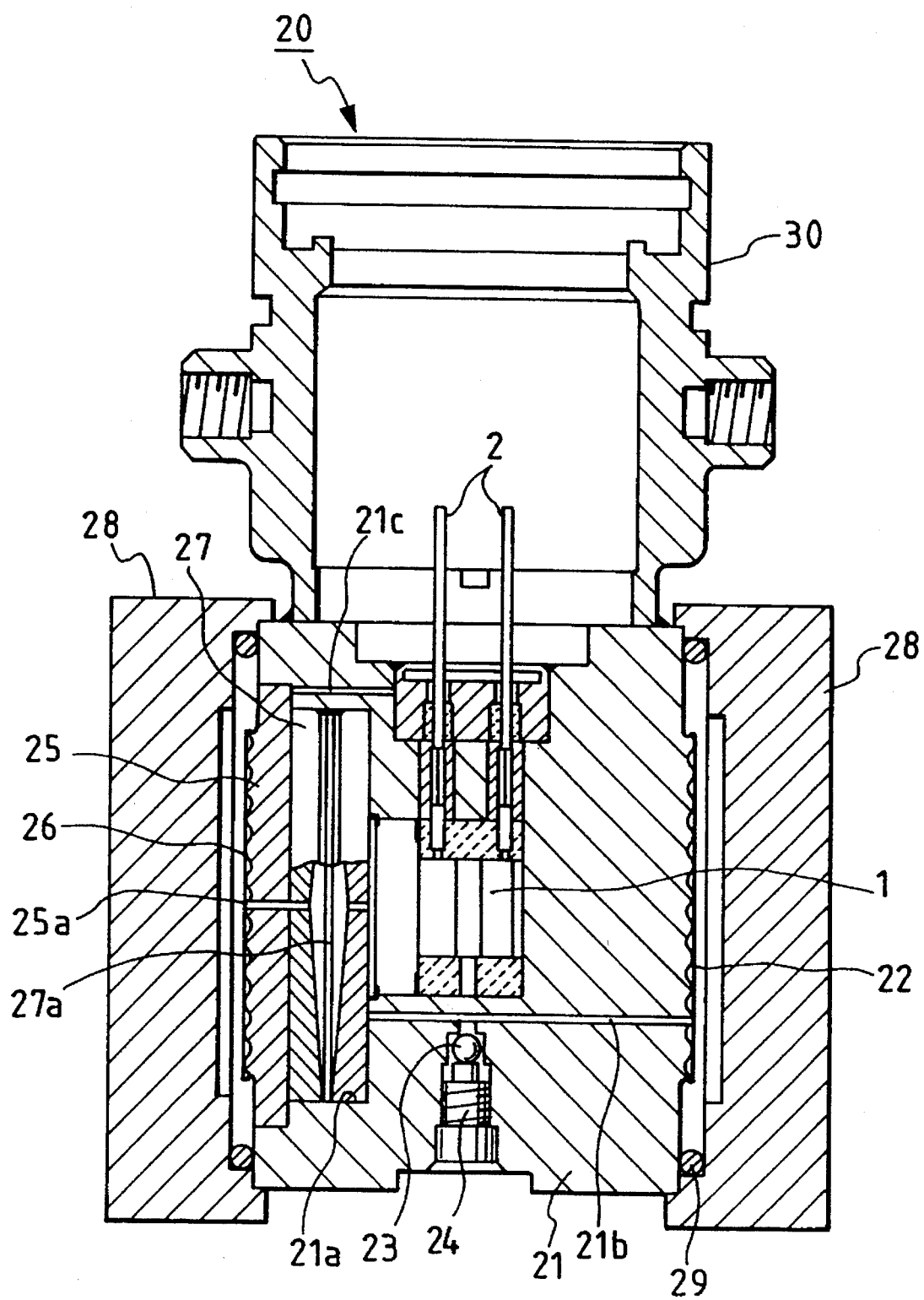
FIG. 2 is a sectional view showing a differential pressure detecting apparatus according to a second embodiment of the present invention.
Figure 3:
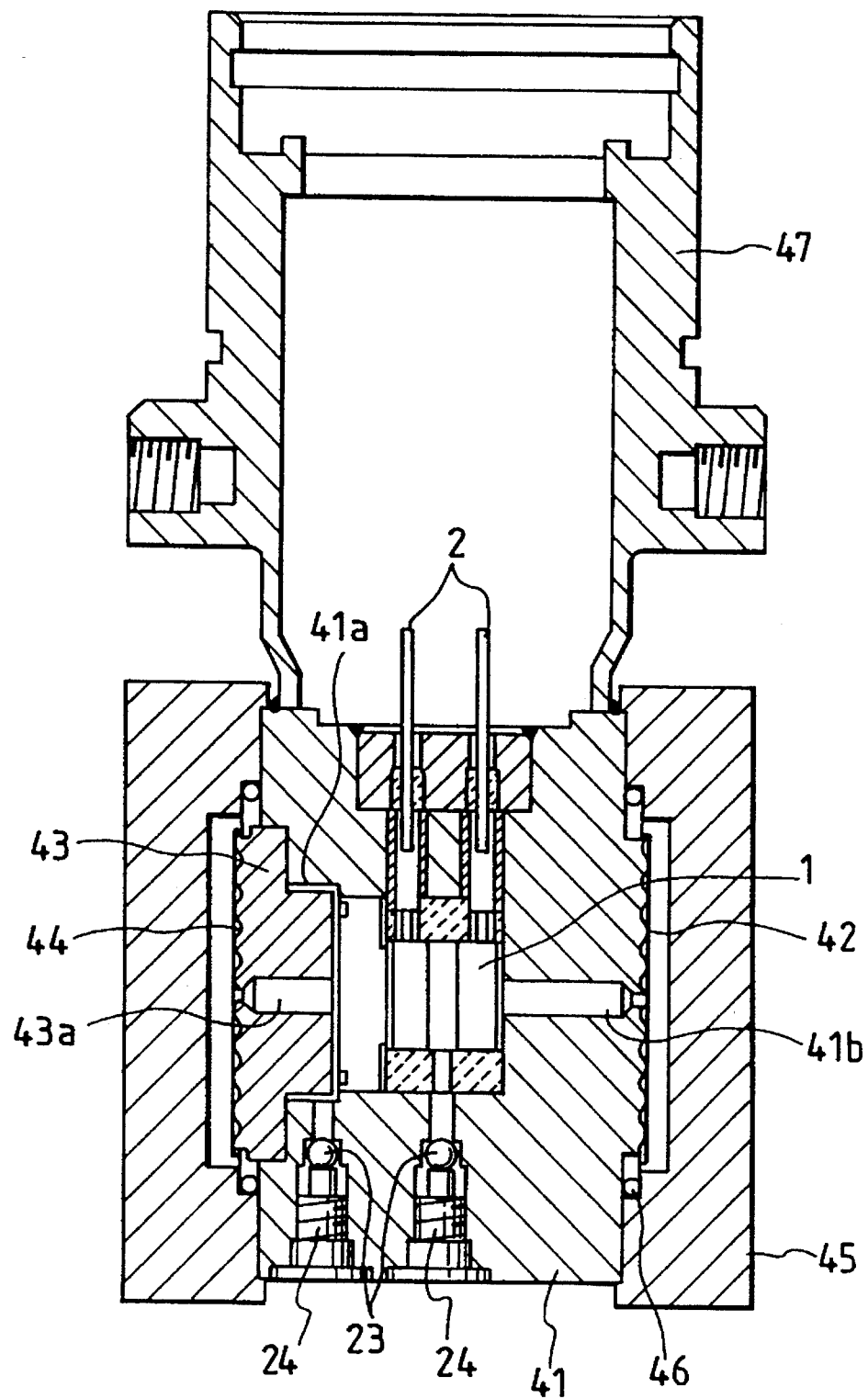
FIG. 3 is a sectional view of a conventional differential pressure detecting apparatus.

A second embodiment corresponding to the second conventional example is constituted as a differential pressure detecting apparatus 20, and designed as shown in the sectional view of FIG. 2. In the drawing, this differential pressure detecting apparatus 20 is mainly constituted by a body 21 including a differential pressure detection portion 1 and a diaphragm unit 27, a sub-body 25, left and right covers 28, and an upper case 30. The body 21 is formed into a conical shape having parallel end surfaces on the left and right sides, and a closed-end countersunk hole 21a having two-stages of countersunk portions is formed in the left end surface. The right end surface of the body 21 has a gap between the body 21 and a seal diaphragm 22 provided there, and the right end surface is finished to a wavy shape corresponding to the diaphragm 22. This seal diaphragm 22 receives one of introduced pressures relating to the differential pressure to be measured. A through hole 21b is formed so as to be opened to the right end surface of the body 21 and the first-stage small-diameter countersunk surface of the countersunk hole 21a, and a hole 21c is formed so as to communicate from the two-stage large-diameter countersunk surface of the countersunk hole 21a to the differential pressure detection portion 1. In addition, a hole which is not referenced in, the drawing is formed so as to communicate with the hole 21b from the lower portion of the outer circumferential surface of the body 21. This hole is provided for filling the inside space with silicone oil which is a liquid for transmitting pressure, and is sealed by balls 23 and thrust screws 24 after completion of filling the silicone oil.

The diaphragm unit 27 is shaped into a disc, and has a disc-like protective diaphragm 27a, conical spaces disposed on the both sides thereof and not referenced in the drawing, and a hole communicating with these spaces as shown in the partially exploded drawing. This diaphragm unit 27 is inserted into the first-stage countersunk portion of the countersunk hole 21a, and has a function corresponding to that of the protection portion 60 in the conventional example. That is, the protective diaphragm 27a corresponds to the protective diaphragm 65 in the conventional example, and the conical spaces correspond to the hollow portions 63 in the same example.

The differential pressure detection portion 1 is inserted into the hole portion of the countersunk hole 21a of the body 21, and leads 2 from the differential pressure detection portion 1 are led out upward through the upper portion of the outer circumferential surface of the body 21. The sub-body 25 is formed into a disc, and a hole 25a is formed so as to penetrate the sub-body 25 in the axial direction thereof. The left side surface of the sub-body 25 has a gap between the sub-body 25 and a seal diaphragm 26 provided there for receiving the other pressure relating to the differential pressure to be measured, and finished into a wavy form corresponding thereto. The sub-body 25 is inserted into the first-stage countersunk portion of the countersunk hole 21a and fixed by welding. The hole 25a communicates with the left conical space of the diaphragm unit 27. After the differential pressure detection portion 1, the diaphragm unit 27 and the sub-body 25 are inserted to the body 21, and fixed by welding, the inside space among the body 21, the diaphragm unit 27 and the sub-body 25 is filled with silicone oil, and thereafter sealed by the balls 23 and the thrust screws 24 as mentioned above.

The right and left covers 28 have holes (not-shown) formed perpendicularly to the plane of the drawing for introducing the respective pressures relating to the differential pressure to be measured. The covers 28 are screwed so as to be fixed to the body 21 air-tightly through O-rings 29 by not-shown screws respectively to thereby cover the respective seal diaphragms 22 and 26. The upper case 30 is a columnar member including therein an amplifier, arithmetic operation circuits, an indicator and so on, and the circumferential edge portion of the upper case 30 is fixed by welding to the upper portion of the outer circumferential surface of the body 21.

One of the introduced pressures relating to the differential pressure to be measured is received by the seal diaphragm 22 through a not-shown introducing hole of the right cover 28 of the body 21. The received pressure is transmitted to the right space of the diaphragm unit 27 through the enclosed liquid, and at the same time, to the corresponding side of the differential pressure detection portion 1. The other introduced pressure is received by the seal diaphragm 26 through an introducing hole of the left cover 28 of the body 21. On the one hand the received pressure is transmitted to the left space of the diaphragm unit 27 through the enclosed liquid, and at the same time, to the corresponding side of the differential pressure detection portion 1. When only one of the introduced pressures relating to the differential pressure to be measured operates as a large biased pressure because of a wrong operation or the like, the differential pressure detection portion 1 is prevented from receiving an excessive pressure by a well-known protection function based on the protective diaphragm 27a of the diaphragm unit 27, and therefore protected from the large biased pressure. Further, the whole of the welded portion at the place which contacts with the enclosed liquid can be disposed inside the body 21, so that the welded portion can be prevented from contacting with outside air.

According to the present invention, one of introduced pressures relating to the differential pressure to be measured is received by a first seal diaphragm through an introducing hole of a cover disposed on one of end surfaces of a body, and transmitted to a differential pressure detection portion through an enclosed liquid. The other introduced pressure is received by a second seal diaphragm through an introducing hole of a cover disposed on the outer circumferential surface of the body, and transmitted to the differential pressure detection portion through the enclosed liquid. Accordingly, there is no portion projecting sideways, and the apparatus as a whole can be designed as a columnar body, and can be constituted by a small number of parts. It is therefore possible to make the apparatus small in size, light in weight and low in cost, and also it is possible to improve the handling. Particularly when the apparatus is applied to the detection of gauge pressure, that is, when the other of introduced pressures is an atmospheric pressure, more conspicuous effects can be expected from the viewpoints of reducing the size, the weight and the cost.

In addition, according to the present invention, one of the introduced pressures relating to the differential pressure to be measured is transmitted to one of spaces of a diaphragm unit and a differential pressure detection portion respectively, and the other introduced pressure is transmitted to the other space of the diaphragm unit and the differential pressure detection portion respectively. Therefore, when only one of the introduced pressures relating to the differential pressure to be measured operates as a large biased pressure because of a wrong operation or the like, the diaphragm unit protects the differential pressure detection portion from the large biased pressure, so that the differential pressure detection portion is prevented from receiving an excessive pressure. It is therefore possible to improve the reliability of the apparatus. Moreover, the differential pressure detection portion and the diaphragm unit are included in the body so as to accelerate the miniaturization of the apparatus. Further, the whole of a welded portion of the place which contacts with the enclosed liquid is disposed in the body so as not to contact with outside air. Accordingly, even if the outside air is corrosive, there is no fear that the welded portion is corroded. Thus, it is possible to improve the corrosion resistance of the apparatus.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A differential pressure detecting apparatus comprising:

a main body having a closed-end hole having a countersunk portion and formed in the outer circumferential surface of said main body at right angles to the axis of said main body, and a pressure transmission hole, said main body including a differential pressure detector inserted into said closed-end hole and having leads led out from the other end surface of said main body, a first seal diaphragm provided in one end surface of said main body for receiving one of introduced pressures relating to a differential pressure to be measured, said pressure transmission hole transmitting the received introduced pressure to said differential pressure detector;

a sub-body inserted into said countersunk portion of said closed-end hole, and having a hole through which the received introduced pressure is transmitted to said differential pressure detector, said sub-body including a second seal diaphragm provided in the outer end surface of said sub-body for receiving the other introduced pressure;

a first cover provided on said one end surface of said main body, and having a hole for introducing a first pressure for said first seal diaphragm; and a second cover provided on said outer circumferential surface of said main body, and having a hole for introducing a second pressure for said second seal diaphragm;

wherein a pressure transmitting liquid is enclosed in an inside space between said main body and said sub-body.

2. A differential pressure detecting apparatus as claimed in claim 1, wherein said main body is of a columnar shape, and said sub-body is of a disc-like shape.

3. A differential pressure detecting apparatus as claimed in claim 1, wherein said pressure transmitting liquid is silicone oil.

4. A differential pressure detecting apparatus as claimed in claim 1, further comprising a ball and a thrust screw for sealing said pressure transmitting liquid.

5. A differential pressure detecting apparatus as claimed in claim 1, wherein said second pressure relating to the differential pressure to be measured is an atmospheric pressure, and said second cover corresponding to the other introduced pressure is a plate-like member provided with air permeability in the outer circumferential surface of said main body.

6. A differential pressure detecting apparatus comprising:

a main body having parallel end surfaces and a closed-end hole having two-stages of countersunk portions, said main body including a first seal diaphragm provided in one of said end surfaces for receiving one of introduced pressures relating to a differential pressure to be measured and a differential pressure detector inserted into said closed-end hole formed in the other end surface and having leads led out from the outer circumferential surface of said main body;

a disc-like diaphragm unit inserted into the first-stage small-diameter countersunk portion of said main body, and including a protective diaphragm and spaces disposed on both sides of said protective diaphragm;

a disc-like sub-body inserted into said second-stage large-diameter countersunk portion of said main body, said sub-body including a second seal diaphragm provided in the outer end surface of said sub-body for receiving the other introduced pressure, and a hole defined for transmitting the received introduced pressure to one of said spaces on the both sides of said diaphragm unit;

a first cover provided on one of said end surfaces of said main body and having a first hole for introducing a first pressure for said first seal diaphragm; and a second cover provided on the other end surface of said main body, and having a first hole for introducing a second pressure for said second seal diaphragm of said sub-body;

wherein said respective introduced pressures relating to the differential pressure to be measured are transmitted to respective spaces of said differential pressure detector and said diaphragm unit through a pressure transmitting liquid enclosed in inside spaces of said main body, said sub-body and said diaphragm unit.

7. A differential pressure detecting apparatus as claimed in claim 6, wherein said pressure transmitting liquid is silicone oil.

8. A differential pressure detecting apparatus as claimed in claim 6, further comprising a ball and a thrust screw for sealing said pressure transmitting liquid.

* * * * *